United States Patent [19]
Shanks

[11] 4,232,948
[45] Nov. 11, 1980

[54] LIQUID CRYSTAL DISPLAY DEVICE

[75] Inventor: Ian A. Shanks, Malvern, England

[73] Assignee: Secretary of State for Defence, London, England

[21] Appl. No.: 488,069

[22] Filed: Jul. 12, 1974

[30] Foreign Application Priority Data

Jul. 18, 1973 [GB] United Kingdom ............ 34162/73

[51] Int. Cl.³ ............................................ G02F 1/133
[52] U.S. Cl. .................................. 350/347 R; 350/157; 350/335
[58] Field of Search ............ 350/150, 151, 157, 158, 350/160 LC, 347 R, 335

[56] References Cited

U.S. PATENT DOCUMENTS

| | | | |
|---|---|---|---|
| 3,501,219 | 3/1970 | Caulfield | 350/150 |
| 3,731,986 | 5/1973 | Fergason | 350/150 |
| 3,756,694 | 9/1973 | Soref et al. | 350/160 LC |
| 3,784,280 | 1/1974 | Bigelow | 350/150 |
| 3,785,721 | 1/1974 | Harsch | 350/150 |
| 3,806,227 | 4/1974 | Grenbel et al. | 350/150 |
| 3,813,144 | 5/1974 | Kumada et al. | 350/150 |

OTHER PUBLICATIONS

Scheffer: "New Multicolor Liquid Crystal Displays That Use A Twisted Nematic Electro-Optical Cell," *Journal of Applied Physics*, vol. 44, Nov., 1973.

*Primary Examiner*—Edward S. Bauer
*Attorney, Agent, or Firm*—Stevens, Davis, Miller & Mosher

[57] ABSTRACT

A liquid crystal device includes a liquid crystal cell capable of rotating plane polarized light, one or more layers of a birefringent material, and polarizers. Application of voltages to the liquid crystal cell changes the angular rotation of light passing through the device and hence changes the observed color. The actual color observed is dependent on the birefringent film, its thickness and its relative angular orientation to the polarized light.

18 Claims, 5 Drawing Figures

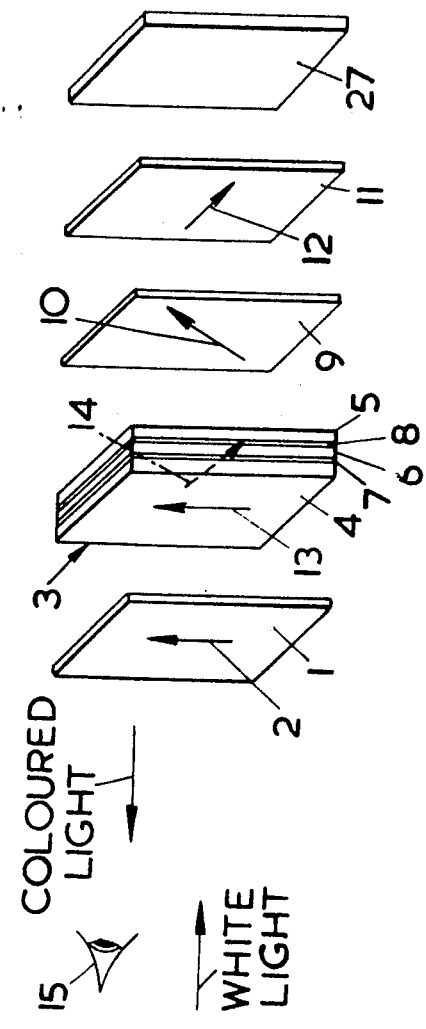
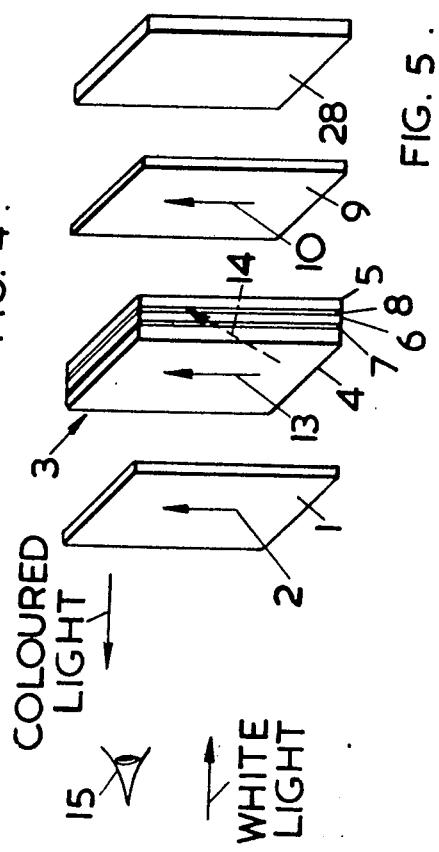
FIG. 4.
FIG. 5.

LIQUID CRYSTAL DISPLAY DEVICE

This invention relates to liquid crystal display devices.

In a liquid crystal device a cell is formed by enclosing a layer of a liquid crystal material between two glass plates. One such cell is known as the twisted nematic cell or the Schadt & Helfrich Effect cell. In the twisted nematic cell plane polarised light passing through the cell is rotated by an amount determined by the relative angular alignment of liquid crystal molecules at the interfaces with the glass. Orientation of molecules is achieved by a rubbing of the glass surface. Typically a twisted nematic cell is arranged to rotate polarised light by 90° although rotation by other angles may also be obtained. Application of a suitable voltage to the liquid crystal layer causes the molecules in the layer to align themselves parallel to the applied field so polarised light passes through without rotation.

An object of this invention is to provide colour changes in a liquid crystal device.

According to this invention a liquid crystal device includes a liquid crystal cell capable of rotating plane polarised light, at least one layer of a birefringent material arranged parallel to the cell, a polariser also arranged parallel to the cell, and means for applying a variablee voltage across the liquid crystal cell whereby polarised light passing through the device may be observed to exhibit colour changes.

The birefringent material may be one or more layers of cellulose film (e.g. 'Cellophane'), polyvinyl alcohol film, or polyvinyl fluoride film. Alternatively the birefringent material may be a liquid crystal material layer whose birefringence is variable with voltage applied across the layer. For example a liquid crystal cell using the Freedericksz effect with a nematic liquid crystal material having an anisotropy of dielectric constant less than 0, or one greater than zero. Or a twisted nematic cell may be used with the orientation of molecules at the surface of the liquid crystal layer arranged at 45° to the polarisation axis of the polariser or an analyser.

A thin film of optically transparent birefringent material, such as cellulose film ('Cellophane'), can give rise to vivid colours when placed between polarisers. This effect is maximised when the polarisers are at 0° or 90° relative to each other and when the optical axis of the birefringent film is at 45° to one of the polarisers. Under these conditions it is possible to produce two distinct hues by rotating one of the polarisers through 90°. These hues are generally related e.g. blue and yellow, green and magenta, red and cyan. Intermediate orientations of the rotated polariser give rise to desaturation of the colours and to white light transmission when the polariser is at 45° i.e. parallel to the optic axis of the birefringent film. Different or multiple thicknesses of the birefringent film give rise to different primary-complementary colour combinations provided that, when multiple thicknesses are utilised, the optic axes of all the layers are parallel to one another and at 45° to one of the polarisers.

The two colours observed, for the two relative positions of the polarisers, is dependent on the thickness of birefringent material used, and its birefringence.

The invention will now be described by way of example only in the accompanying drawings of which:

FIG. 3 is a sectional view of a modified form of FIG. 2;

FIG. 4 is a modification to FIG. 1 so the device works by reflected light;

FIG. 5 is a further modification to FIG. 1.

Figure 1:
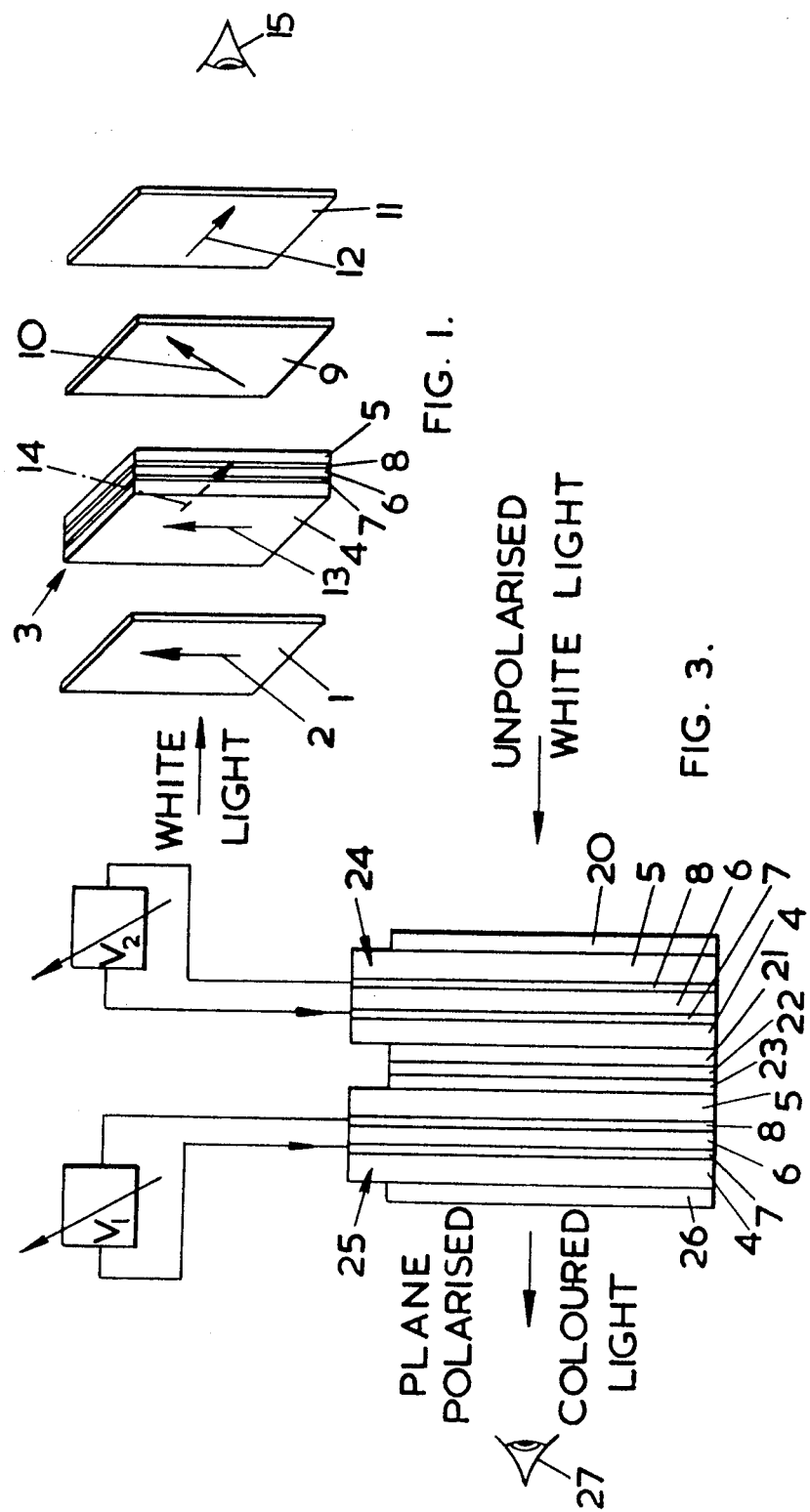
FIG. 1 is an exploded view showing somewhat diagrammatically a simple form of the invention.

FIG. 1 is an exploded view of a simple colour change device. As shown it comprises a polariser 1 arranged with its axis of polarisation vertical, as denoted by arrow 2. Behind the polariser is a liquid crystal cell 3 comprising two glass plates 4, 5 spaced about 6-40$\mu$ apart with a layer 6 of liquid crystal material filling the space. The material 6 has a positive dielectric anistropy and may be 15%:85% mixture of PEBAB & MBBA or cyano biphenyls. Transparent (to the wavelength to be transmitted) electrodes 7, 8 are deposited on one face of each glass plate and when connected to a voltage source (not shown) apply a voltage across the layer 6. Behind the cell 3 is a layer of birefringent material 9 such as cellulose film arranged with its optical axis at 45° to the polariser 1, as indicated at 10. Behind the birefringent layer 9 is a polariser 11 or analyser arranged with its axis of polarisation horizontal as indicated by arrow 12. The various parts shown in FIG. 1 are constructed with each part in contact with one another and are merely shown exploded for ease of understanding. As already noted the cell 3 comprises a liquid crystal layer 6 and two glass plates 4, 5.

These plates 4, 5 are rubbed prior to assembly, e.g. with a cellulose tissue, on the faces to be in contact with the liquid crystal layer 6. On assembly the two plates are arranged with the rubbed surfaces orthogonal as indicated at 13, 14. A cell constructed in this manner will rotate polarised light through 90° in the absence of a voltage across the liquid crystal layer. On application of a suitable voltage molecules in the liquid crystal gradually align themselves parallel to the applied voltage field until at a sufficiently high voltage all molecules are so aligned and the layer becomes non-rotating to plane polarised light. As shown in FIG. 1 the glass plate 4 adjacent polariser 1 is arranged with its direction of rubbed surface parallel to the axis of polarisation. Similarly the other glass plate 5 has its direction of rubbing parallel to the axis of polarisation of the polariser 11.

The device of FIG. 1 works equally well if the axis of polarisation of the polariser or the analiser are perpendicular to the rubbing direction of the adjacent glass plate. The polariser and analyser may have their axes of polarisation crossed as shown, or parallel.

In operation, with no voltage applied to the cell, white light from a source is vertically polarised by the first polariser 1 and emerges from the second polariser 11 to be seen by an observer 15 as horizontally polarised light of predominantly one colour e.g. blue. Application of a suitable voltage across the cell gradually changes the molecular orientation so that the proportion of incident light transmitted with perfect linear polarisation is reduced giving, in general, elliptical polarisation. At the limit the cell does not rotate the plane of polarisation of light from the first polariser. In this condition the light seen by the observer 15 is changed in colour from e.g. blue to yellow. Different thicknesses of birefringent layers produce other related pairs of colours e.g. green and magenta, red and cyan. This is somewhat similar to the effect obtained by rotation of crossed polarisers noted above.

As described with reference to FIG. 1 a single layer of birefringent material is used. Two or more layers of birefringent material also produce other related colour combinations, all layers being preferably arranged with their optical axes at ±45° to one of the polarisers. If the layers all have their optical axes parallel to one another the effect is the same as a single layer of birefringent material of thickness equal to the total thickness of the layers.

If the optic axes of adjacent birefringent layers are non-parallel, then rotation of either the polariser or the analyser through 180° can give a continually varying series of colours. An exception to this is the case of two layers of non-parallel optic axes where white light is transmitted when the polariser and analyser are parallel or perpendicular to the optic axes of the sheets adjacent to them. The amount of white light transmitted in this case depends on the angle between the optic axes of the two sheets. Colours can be obtained with the two sheet composite layer for other orientations of polariser or analyser. In all cases the actual colour obtained in a given situation depends on the optical retardations of the various sheets and can be varied by rotating the polariser or analyser. For certain particular values of the optical retardations and the polariser and analyser angles, a good approximation to white light can be obtained. All cases can be calculated by a simple, if lengthy, application of the mathematics of anisotropic optics known in the art.

The theoretical basis for calculating the colours to be observed is as follows:

When one birefringent layer is used the transmission of the device to unpolarised light is given by $$T = \tfrac{1}{2}\cos^2(\alpha - \beta) - \tfrac{1}{2}\sin 2\alpha \sin 2\beta \sin^2(\delta/2)$$

where $\alpha$ and $\beta$ are the angles between the polariser and analyser transmission axes respectively and the optic axis of the layer, and $\delta$ is the optical retardation of the layer given by $$\delta = (2\pi/\lambda)\Delta n t$$

where
$\Delta n = n_e - n_o$,
$t$ = thickness
$n_o$ = refractive index of the ordinary wave
$n_e$ = refractive index of the extraordinary wave.

When a composite layer, having n sheets of optical retardation $\delta$, is used then the transmission of the device becomes, in general, a polynomial of order n in $\cos \delta$. Thus $$T = \sum_{r=0}^{n} a_r \cos^r \delta$$

where the coefficients $a_r$ depend on the angles of the polariser, the analyser and the optic axes of the n sheets relative to some fixed datum. When the optical retardation of the n sheets is not the same but has values $\delta_i$, (i = 1, 2, 3, ... n), then the transmission of the device has a more complex form involving terms of the form $\cos \delta_k$, $\cos \delta_l$, $\cos \delta_m$ ... where k = 1, 2 ... n, l = 1, 2 ... n, m = 1, 2 ... n. From these expressions the alignment of the birefringent layers, and their thickness may be determined for required colours.

The voltage applied to the cell across the liquid crystal layer may be either D.C. or A.C. square or sinewave of frequency up to about 100 kHz; the untwisting effect responding to the RMS value of the A.C. voltage above about 20 Hz. The untwisting effect exhibits a threshold voltage (below which no untwisting occurs) of around 1 v–5 v AC and 5 v–10 v DC and is essentially complete at voltages around 1 v–10 v above the threshold voltage. The actual value depends on the liquid crystal material being used. The cell described above rotated polarised light through 90°; it should be noted this rotation may arbitrarily be clockwise or anticlockwise. The rotational effect of the cell is independent of the wavelength of light used provided the cell thickness is appropriate to the wavelength of light used.

The cell of FIG. 1 may be arranged to rotate plane polarised light by 45°. In such a case the birefringent layer would still be arranged with its axis of polarisation at 45° to the rubbing direction of its adjacent glass slide and the analiser arranged parallel to this rubbing direction.

Application of zero voltage, or a voltage above the threshold voltage respectively causes a coloured or a white light (i.e. transparent) to be seen by an observer. If the axis of polarisation of the birefringent layer 9 is arranged parallel to the rubbing directions of the adjacent glass plate 5 then the device would appear clear (transparent) with no voltage on the cell 3 and coloured when a suitable voltage is applied.

Thus using different thicknesses of birefringent layer devices may be constructed to act as red, or green, or blue filters or as cyan, magenta, or yellow filters.

These devices could be used in colour photography where to produce colour prints a sensitive paper is exposed to light from a negative through three coloured filters in sequence. Conventionally the filters cyan, magenta and yellow, are separately moved between the negative and paper, or the light source and negative, by mechanical or electromechanical apparatus.

The three mechanically operated filters could be replaced by three liquid crystal device of this invention permanently arranged between the negative and the paper. Each device would act as a separate filter i.e. a cyan or a magenta, or a yellow filter. When for example a cyan filter is required to remove red light the cyan device would be voltage operated to appear cyan whilst the two other filters would be voltage operated to appear clear i.e. transparent. Similarly the other colours, magenta, and yellow, would be separately operated to control the amounts of green and blue light reaching the paper so that the paper received controlled exposures to red, green and blue light. Since the three colour filters are operated electrically with no physical movement the overall time taken to fully expose a paper is considerably reduced from the conventional moving filters. A similar system, using red, green and blue devices, may be used in an additive printing machine where sequential exposures are made using red, green and blue light.

Figure 2:
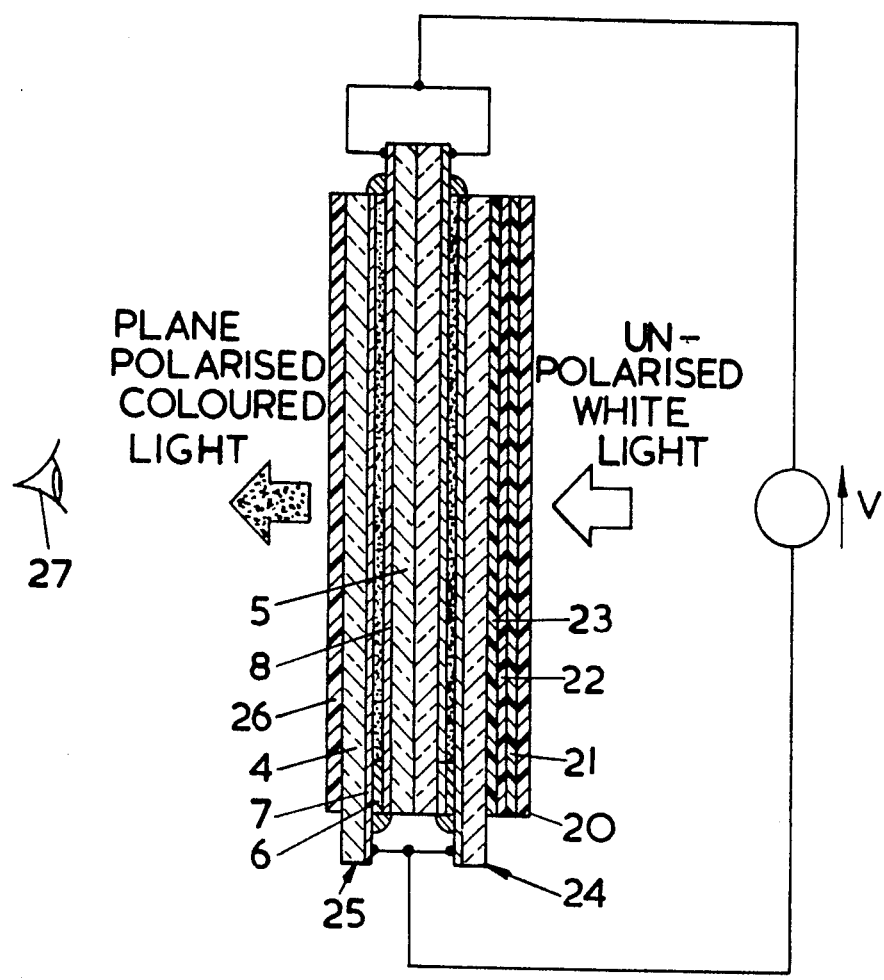
FIG. 2 is a sectional view of another form of the invention.

An arrangement for producing more observed colours is shown in FIG. 2. Basically it comprises in series a first polariser 20, three continuous layers 21, 22, 23 of birefringent film, two liquid crystal cells 24, 25 (similar to that in FIG. 1) having the same sense of twist and a second polariser 26. Both first 20 and second 26 polarisers are arranged with their axis of polarisation in alignment. The three layers of birefringent material 21, 22, 23 are arranged with one layer having its optical axis at 45° to the axis of polarisation of the first polariser; the other layers are arranged about 20° either side of this although other angles may also be used. Asymmetric angular displacements may also be used. More than three layers of birefringent layers may be used.

The two liquid crystal cells 24, 25 are each constructed to rotate polarised light through 90° and are arranged relative to one another so that polarised light passing through both cells is rotated by 180° in the absence of any voltage applied across the liquid crystal layers 6. As shown the transparent electrodes 7, 8 on the cells 24, 25 are connected in parallel to ensure identical voltages across each liquid crystal layer 6; the cells could also be connected in series but this would result in different voltages across the layers unless the impedance of both cells is identical.

In operation white light from a source (not shown) is directed onto the first polariser 20 where it is converted to linearly polarised light. This polarised light passes through the three layers 21, 22, 23 of birefringent material and through the two cells 24, 25 where it is retarded or rotated by an amount dependent on the voltage applied to the cells; in the absence of a voltage the light is rotated by 180°, and with increasing voltage this rotation is reduced to zero.

Light from the cells 24, 25 then passes through the second polariser 26 to be viewed by an observer at 27. As seen by the observer 27 the light will be a colour which varies across the entire visible spectrum as the voltage across the cells is varied.

In a modification to FIG. 2 the liquid crystal cell 24 is constructed to rotate plane polarised light through 45° and is arranged with the direction of rubbing on the plate adjacent plate 5 of cell 25 parallel or perpendicular to plate 5. Additionally the cells 24, 25 are connected to separate voltage sources. Thus by switching the cells 24, 25 on or off separately or together plane polarised light passing through the two cells 24, 25 may be rotated in steps of 0°, 45°, 90°, and 135° and hence a four different colour display may be made with appropriate selection of composite birefringence layer and orientation of optical axes.

FIG. 3 is a modification of FIG. 2 although it uses the same components which have the same reference numerals in both Figures. As shown in FIG. 3 the three layers 21, 22, 23 of birefringent material are arranged between the liquid crystal cells 24, 25; also each cell has its own voltage control $V_1$, $V_2$. If each cell is capable of rotating plane polarised light through 90° (as in FIG. 2) the arrangement allows incoming light to be rotated in the steps 0°, 90°, or 180°.

As previously noted the twisted nematic cell with rotate light through 90° when the rubbed glass plates are arranged with the direction of rubbing at 90°. By arrangement of the angle between rubbing direction a cell can be constructed to rotate light from any set value up to 90° or larger in the absence of a voltage across the liquid crystal layer 6. Thus for example the cell 24 of FIG. 3 can be arranged to rotate light 30° and the cell 25 rotate light 60°. With such an arrangement light passing through the device can be rotated in the steps of 0°, 30°, 60°, and 90° by application of appropriate voltages, and hence a four separate colour device may be made with appropriate thicknesses of a composite birefringent layer and orientation of optical axes.

Other arrangements are possible, and additional liquid crystal cells may be used.

For example a further liquid crystal cell may be added to the device shown in FIG. 2. Such a cell could be arranged between the polariser 20 and birefringent layer 21 with the rubbing direction of its side adjacent the polariser 20 parallel or perpendicular to the axis of polarisation of the polariser 20. This further cell may be arranged to rotate plane polarised light through $22\frac{1}{2}°$. If the cells 24, 25 are arranged to rotate plane polarised light through 45° and the 90° respectively as described above, and all three cells have an independent voltage supply then the device is capable of rotating plane polarised light in discrete steps of 0°, $22\frac{1}{2}°$, 45°, $67\frac{1}{2}°$, 90°, $112\frac{1}{2}°$, 135°. Such device could display six separate colours plus white by suitable choice of composite birefringence layer 21, 22, 23.

In the above description the birefringent layers of FIGS. 1, 2, 3 have been described as complete layers across the width of the cell. One or more layers can be in the form of smaller shaped pieces to form a display. For example the pieces could be shaped into symbols e.g. an arrow, or into letters or numbers. The symbols, letters or numbers could then be dislayed in changing colours on a different coloured background.

Any suitable variable voltage source may be used to control the observed colour.

A modified form of the invention, shown in FIG. 4, works by reflected light rather than transmitted light as in FIGS. 1, 2, and 3. It is similar in construction to that shown in FIG. 1, similar parts being identified by the same reference numerals, and comprises a polariser 1 arranged with its axis of polarisation vertical (it may also be horizontal) as shown by arrow 2. Behind the polariser 1 is a liquid crystal cell 3 (or two cells) arranged to rotate plane polarised light by up to 180°. The rubbing direction on the cell wall adjacent to the polariser is vertical as denoted by arrow 13. The rubbing direction on the other cell wall 5 is shown as horizontal by arrow 14; in this case the cell 3 rotates plane polarised light by 90° in its off condition. Behind the cell 3 is a layer of birefringent material 9. If the cell 3 is capable of rotating plane polarised light up to 180° then this layer may be a composite layer with the individual layer arranged with their optical axis in different directions i.e. one at 45° as shown by arrow 10 and the other symmetric or assymetric about the 45° arrow 14. Behind the birefringent layer 9 is an analyser 11 arranged with its polarisation axis horizontal as shown by arrow 12. Behind the analyser is a mirror or a diffuse reflector 27 e.g. white paper or aluminium paint.

In operation, with a mirror or diffuse metallic reflector (e.g. aluminium paint) 27 and the cell 3 in its off condition i.e. zero voltage applied thereto, white unpolarised light passes through the polariser 1 and enters the cell 3 where its plane of polarisation is rotated from vertical to horizontal. This horizontally polarised light passes through the birefringent layer 9 and analyser 11; at the mirror or diffuse metallic reflector 27 coloured horizontally polarised light passes back through the analyser 11, birefringent layer 9, cell 3 and polariser 1 to be seen by an observer 15 as a coloured light (e.g. blue). The strength of the colour is reinforced by its double passage through the device.

When a voltage, above the threshold voltage, is applied to the cell 3 it ceases to rotate plane polarised light. Thus white vertically polarised light from the polariser 1 passes to the birefringent layer 9. Horizontally polarised light of a different (e.g. yellow) colour is reflected by the mirror or diffuse metallic reflector 27 back through the device to be seen by an observer as a strongly coloured (e.g. yellow) light.

If the reflector 27 is a diffuse dielectric reflector (e.g. white paper), light reaching the reflector is coloured and plane polarised but after reflection loses its polarisation but not its colour so that some of the light is absorbed on re-entering the analyser 11. The observed colours are thus reduced in intensity compared with a device having a reflecting mirror or diffuse metallic reflector 27. In the context of the above devices a "diffuse metallic reflector" is defined as a diffuse reflector which preserves the polarisation of the incident light. It need not be metallic but would be, for example a Ballotini glass bead reflector.

FIG. 5 shows another modified form of the invention similar to FIG. 1 with similar parts given the same reference numerals. The device of FIG. 5 comprises a polariser 1 arranged with its axis of polarisation vertical as indicated at 2; a liquid crystal cell 3 arranged with the rubbing direction on the plate 4 vertical as shown at 13 and that on plate 5 at 45° as shown at 14 so that the cell rotates plane polarised through 45°; a birefringent layer 9 arranged with its optical axis vertical as shown at 10; and a mirror or a diffuse reflector 28 which preserves polarisation e.g. an aluminium painted surface.

In operation with zero voltage applied to the cell 3 unpolarised white light is vertically polarised by the polariser 1 and its plane of polarisation rotated through 45° by the cell 3. Polarised light from the cell 3 passes through the birefringent layer 9 (at 45° to its optical axis) is reflected by the mirror back through the birefringent layer 9, the cell 3, and polariser 1 to be seen by an observer 15 as a coloured light. Application of a suitable voltage to the cell causes realignment of the liquid crystal molecules so that the cell no longer rotates the vertically polarised light from the polariser 1. Such vertically polarised light passes through the birefringent layer parallel to its optical axis to be reflected by the mirror to the observer where it is seen as white light.

If the birefringent layer 9 is arranged with its optical axis parallel or perpendicular to the rubbing direction on the adjacent slide 5 then the opposite of the above is observed, i.e. the display is white with zero voltage on the cell 3 and coloured when a suitable voltage is applied to the cell 3. The twist angle of the cell can have any value up to 90°. If a composite layer is used, then two different colours may be obtained in place of one colour and white light. The colours obtained are defined by suitable choice of composite layer and orientation of the polariser 1.

The invention has been described using visible light; it may also operate at other wavelengths by using suitable dimensions and materials for the cell transparent at those wavelengths and polarisers designed to operate at those wavelengths.

One distinct advantage of the devices described is the uniformity of the colours produced, particularly so when the multicolour switching is employed. One modification of the various effects described is to add small quantities of an optically active dopant, for example d-menthol or up to 1% w.w. of a cholesteric liquid crystal, to the nematic liquid crystal used. This imparts a long pitched twisted structure to the nematic liquid having the sense of the rotatory power of the dopant. This allows consistent production of cells having twist of the same sense and confers the additional advantage of inhibiting the appearance of spontaneously produced areas in a cell having the opposite sense of twist from the remainder of the cell which could give rise to an area of different colour. It further allows the production of cells having twist angles greater than 90°.

A device constructed as described above may be used as a variable colour filter in for example alpha numeric displays, matrix displays in which a large number of individual display areas are arranged in a matrix to form a large display.

As another example the liquid crystal cell could be made into a large panel with discrete electrode areas arranged in a matrix. Application of suitable voltages will cause selected areas to exhibit the desired colour.

As another example the invention could be used with monochrome television sets modified to give monochrome pictures of red, green and blue video information in sequence in time. The filter would be placed in front of the monochrome display and voltage controlled to give red, green and blue colours in synchronism with the sequential red, green and blue fields (or blocks of fields). The resulting information would then be integrated by the eye of the observer to give a colour picture corresponding to the original scene. Simpler two colour displays would also be possible.

Other possible uses are:

Use in colorimetric equipment to alter colour balance electronically.

Use in photographic equipment to alter colour balance electronically.

Use in the field of cinematography to record colour picture information on monochrome film. Light from the original scene would be exposed onto a monochrome film through the filter which would be voltage controlled to give red, green and blue information on sequential frames or blocks of frames and an index mark would be made on the film outside the picture area, to denote the colour of each frame. When the film is projected a second filter would be voltage controlled to give the appropriate colour indicated by the index mark. The resulting sequence of red, green and blue frames or blocks of frames would be integrated by the eye of the observer to re-create the colours of the original scene.

Use in liquid crystal technology to identify areas of reverse twist in the type of cells described. It can sometimes happen that a cell with predominantly one sense of rotation can have areas exhibiting rotation in the opposite sense. If such a cell were used in plane of the two cells in FIG. 1 then, on application of a voltage above threshold the areas of reverse twist would become different in colour to the remainder of the cell since the colours produced for rotations of $+\theta$ and $-\theta$ ($0° < \theta < 90°$) will be different.

Other uses in liquid crystal technology to identify changes in molecular orientation.

A further modification of the devices described would be to replace the nematic liquid crystal by a cholesteric liquid crystal whose molecular structure has a pitch which is much longer or much shorter than the wavelengths employed i.e. visible light. In this case the cholesteric liquid crystal is included to adopt the Grandjean plane texture, for example by shearing the liquid between the cell walls by moving one wall relative to the other. Following the method of Fergason U.K. Pat. No. 1,123,117 application of a voltage across the cholesteric film causes its optical activity to vary resulting in a voltage variable rotation of plane polarised light in a manner similar to that of the twisted nematic effect, but through an angle which can be many hundreds of degrees.

I claim:

1. A liquid crystal device comprising:

(1) a liquid crystal cell capable of rotating plane polarized light and comprising:
   (i) two spaced transparent slides,
   (ii) a layer of a liquid crystal material comprising a cholesteric liquid crystal material having a molecular pitch substantially different from the wave length of visible light disposed between the two slides and
   (iii) an electrode structure mounted on each slide for applying an electric field across the thickness of the liquid crystal layer;
(2) at least one layer of birefringent material arranged parallel to the cell; and
(3) a polarizer and analyzer arranged parallel to the cell;
the arrangement being such that when an electric field is applied to the electrode structures the color of light passing through the device is observed to vary with variation in applied electric voltage.

2. A liquid crystal device according to claim 1 wherein the birefringent material comprises at least two layers each arranged with its optical axis at an angle to the optical axis of an adjacent layer.

3. A liquid crystal device according to claim 1 comprising a plurality of liquid crystal cells each arranged to rotate plane polarized light by a different angle whereby plane polarized light passing through the device may be rotated by a number of angular steps so that a plurality of different colors may be observed.

4. A liquid crystal device according to claim 1 further comprising a reflector and wherein the polarizer and analyzer are the same whereby color changes may be observed by reflection of light through the device.

5. A liquid crystal device according to claim 1 wherein the polarizer is arranged adjacent the cell on the side remote from the bire-fringent layer, and the analyzer is arranged adjacent the birefringent layer on the side remote from the cell whereby color changes may be observed by transmission of light through the device.

6. A liquid crystal device according to claim 2 wherein the layers of birefringent material are of different shape to one another.

7. A liquid crystal device according to claim 1 wherein the liquid crystal material is a mixture of a nematic liquid crystal material and up to 1% by weight of a cholesteric liquid crystal material.

8. A liquid crystal device according to claim 1 wherein the birefringent material is a liquid crystal material contained in a liquid crystal cell and whose birefringence is variable with applied electric field.

9. A liquid crystal device according to claim 1 wherein the birefringent material is cellulose film.

10. A liquid crystal device according to claim 1 wherein the birefringent material is a polyvinyl alcohol film.

11. A liquid crystal device according to claim 1 wherein the electrodes are arranged in descrete areas of the cell whereby different areas of the device may be observed to exhibit color changes.

12. A liquid crystal device according to claim 1 forming a color filter wherein the cell is arranged to rotate plane polarized light between 0° and 45° depending on the voltage applied to the cell whereby the observed color changes between a white light and a colored light.

13. A liquid crystal device according to claim 1 wherein the cell is arranged to rotate plane polarized light through 90°, the optical axis of the birefringent material is at 45° to the plane of polarization of light entering the birefringent material, whereby application of a voltage to the cell causes the observed color to change between two related colors.

14. A liquid crystal device comprising:
(1) a plurality of liquid crysal cells each arranged to rotate plane polarized light by a different angle, each cell comprising:
   (i) two spaced transparent slides;
   (ii) a layer of liquid crystal material contained between the slides; and
   (iii) an electrode structure mounted on each slide for applying an electric field across the thickness of said layer;
(2) at least one layer of birefringent material arranged parallel to the cells; and
(3) a polarizer and analyzer arranged parallel to the cells,
the arrangement being such that when electric voltages are applied to the electrode structures polarized light passing through the device may be rotated by a number of angular steps so that a plurality of different colors may be observed.

15. A liquid crystal device comprising:
(1) a liquid crystal cell capable of rotating plane polarized light and comprising:
   (i) two spaced transparent slides;
   (ii) a layer of liquid crystal material contained between the slides; and
   (iii) an electrode structure mounted on each slide for applying an electric field across the thickness of said layer;
(2) at least one layer of a birefringent material arranged parallel to the cell; and
(3) a polarizer and an analyzer arranged parallel to the cell and in front of the cell and birefringent layer; and
(4) a reflector arranged behind the cell and birefringent layer; the arrangement being such that when an electric voltage is applied to the electrode structures the color of light reflected from the device is observed to vary with variation in the applied electric voltage.

16. A liquid crystal device according to claim 15 wherein the birefringent material comprises at least two layers each arranged with its optical axis at an angle to the optical axis of an adjacent layer.

17. A liquid crystal device according to claim 15 wherein the liquid crystal material is a nematic liquid crystal material.

18. A liquid crystal device according to claim 17 wherein the liquid crystal material contains up to 1% of a cholosteric liquid crystal material.

* * * * *